(12) United States Patent
Davis et al.

(10) Patent No.: US 8,270,322 B1
(45) Date of Patent: Sep. 18, 2012

(54) METHOD AND SYSTEM FOR ARBITRATING DATA TRANSMISSIONS

(75) Inventors: Almir Davis, Quincy, MA (US); Jeffrey S. Kinne, Needham, MA (US); Christopher S. MacLellan, Walpole, MA (US); Stephen L. Scaringella, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 1686 days.

(21) Appl. No.: 10/905,391

(22) Filed: Dec. 30, 2004

(51) Int. Cl.
*H04J 1/16* (2006.01)

(52) U.S. Cl. ........ 370/282; 370/230; 370/220; 370/278; 710/106; 710/110; 375/354; 375/220; 375/357

(58) Field of Classification Search .................. 370/216, 370/282, 279, 293, 294, 296, 276, 220, 230; 710/106, 110, 307, 38, 113, 241; 375/354, 375/220, 357
See application file for complete search history.

(56) References Cited

U.S. PATENT DOCUMENTS

| | | | | |
|---|---|---|---|---|
| 4,481,572 A | * | 11/1984 | Ochsner | 710/117 |
| 5,602,878 A | * | 2/1997 | Cross | 375/354 |
| 5,919,250 A | * | 7/1999 | Shimokawa | 709/252 |
| 6,810,455 B2 | * | 10/2004 | Wyland | 710/113 |

* cited by examiner

*Primary Examiner* — Kibrom T Hailu
*Assistant Examiner* — Dady Chery
(74) *Attorney, Agent, or Firm* — Krishnendu Gupta; Deepika Bhayana

(57) ABSTRACT

A system for arbitrating a transmission of data includes a number K of transmitters, a request signal transmission device, a device valid signal transmission device, and a data valid logic device, wherein a transmitter asserts a request signal to request permission to begin a data transmission and transmits transmission-identifying information to a receiver. The data valid logic device deasserts a data valid signal based on the state of a wait signal, thereby preventing a transmission of data from each of the K transmitters at one clock cycle after a clock cycle at which the data signal is deasserted. An arbitration logic device of the receiver selects one of the number K of transmitters to grant permission to transmit data to the receiver and outputs an arbitration signal to a wait logic device instructing the wait logic device to deassert the wait signal of the selected trnasmitter.

14 Claims, 9 Drawing Sheets

METHOD AND SYSTEM FOR ARBITRATING DATA TRANSMISSIONS

FIELD OF THE INVENTION

The present invention is directed generally to a data transmission system and, more particularly, to a data transmission system having improved latency with a reduced gate count and minimal number of handshake signals.

BACKGROUND OF THE INVENTION

A prior art data transmission system 100a as shown in FIG. 1 includes a transmitter 102a for transmitting data to a receiver 104a over a data bus 106a. When data DATA[0]-DATA[N] is to be transmitted from the transmitter 102a to the receiver 104a, the transmitter 102a sends, along with the data, a data valid signal DV to notify the receiver that it is transmitting new data. The receiver 104a samples the data on the data bus 106a when the DV signal is asserted by the transmitter.

The frequency determining delay between the registers of the transmitter 102a and the registers of the receiver 104a is determined by the wire delay of the DV signal plus the fan-out delay of the DV signal feeding all of the multiplexers of the receiver 104a. When the DV signal must be input to many multiplexers, and the distance between the transmitter 102a and receiver 104a is long, the DV signal loses strength during its transmission, causing an operation frequency bottleneck. Therefore, this implementation of the DV signal causes the entire chip on which the transmitter and receiver are included to run at lower frequencies than may be desirable. The same principle applies to the WAIT signal (not shown in FIG. 1), which is transmitted from the receiver 104a to the transmitter 102a in a similar fashion as the DV signal, when the receiver pauses an ongoing data transmission.

One approach to increase the frequency of the data transmission system 100a is shown in FIG. 2. As shown in FIG. 2, data transmission system 100b includes a transmitter 102b for transmitting data to a receiver 104b over a data bus 106b. Receiver 104b includes a register stage 108 for registering the data on the data bus 106b, including the DV signal and the data DATA[0]-DATA[N].

In this data transmission system 100b, the long distance delay between the transmitter and receiver is split into two delays, which allows the data transmission system 100b to operate at higher frequencies. In this system 100b, the DV signal and data are transmitted concurrently and registered in the register stage 108 and then the data is transmitted to the inputs of the multiplexers concurrently with the DV signal, which is transmitted to the control input of the multiplexers.

While this system 100b reduces the delay in transmitting the DV signal and enables the system to operate at higher frequencies, the latency of the system is increased and the gate count is increased significantly over the system 100a.

Data transmission systems such as 100a and 100b typically include several transmitters 102 that compete with each other for the ability to transmit data to the receiver 104. The receiver must arbitrate between the transmitters to grant access to the receiver by one transmitter at a time. Typically, this involves a series of handshake signals between the transmitter and receiver. For example, in order to gain access to the receiver for a data transmission, the transmitter requests the data transfer by asserting a request signal. When the receiver grants access to a particular transmitter, it asserts a grant signal to the particular transmitter. The transmitter then begins the transmission of the data and the data valid signal DV. The receiver then receives the data, but can pause the transmission by asserting the WAIT signal for the particular transmitter. Accordingly, the number of handshake signals required in this data transmission is four.

The number of handshake signals is directly proportional to the design complexity and verification time of the data transmission system. Therefore, fewer handshake signals will result in a less complex system that is simpler to design and which results in shorter verification times.

In the event that a transmitter should fail or a packet being transmitted by the transmitter be faulty, it is important for the receiver to be able to notified of the error so that it can react appropriately to reduce or eliminate the possibility of losing data. Typically, transmitters do not have error recovery mechanisms because their implementation can tend to be complicated. Therefore, the natural response of a faulty transmitter is to reset itself and then wait for instructions from its control unit. The transmitter's sudden failure might cause an unpredictable behavior on the receiver side, which in turn could have a catastrophic impact on the entire data transmission system.

SUMMARY OF THE INVENTION

The present invention is directed to a data transmission system having low latency and increased frequency of operation while having a reduced number of gates in the data transmission system and a reduced number of handshake signals.

BRIEF DESCRIPTION OF THE DRAWINGS

These and other features of the invention will become more readily apparent from the following detailed description when read together with the accompanying drawings, in which.

DETAILED DESCRIPTION

Figure 1:
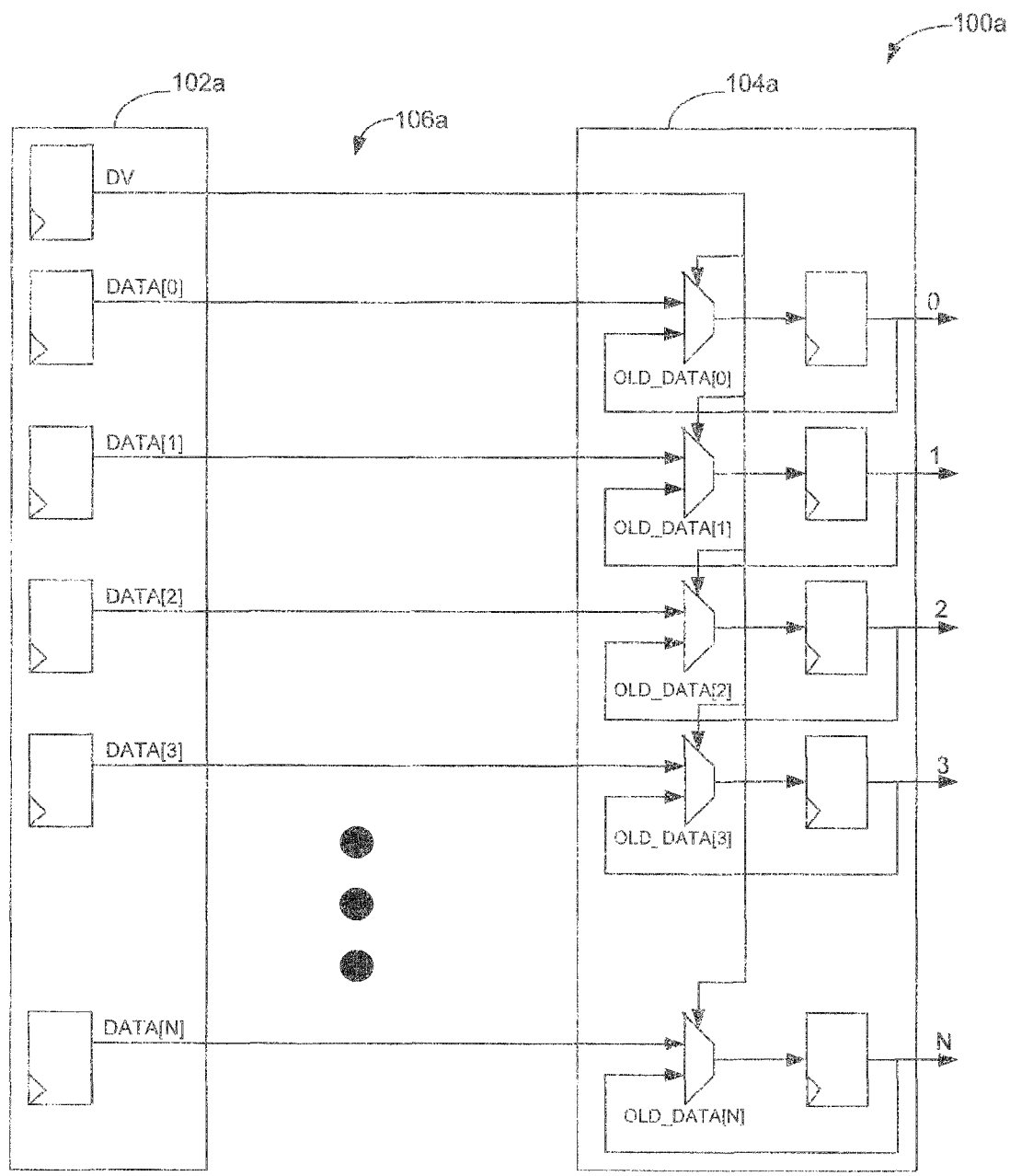
FIG. 1 is a schematic diagram of a prior art data transmission system.
Figure 2:
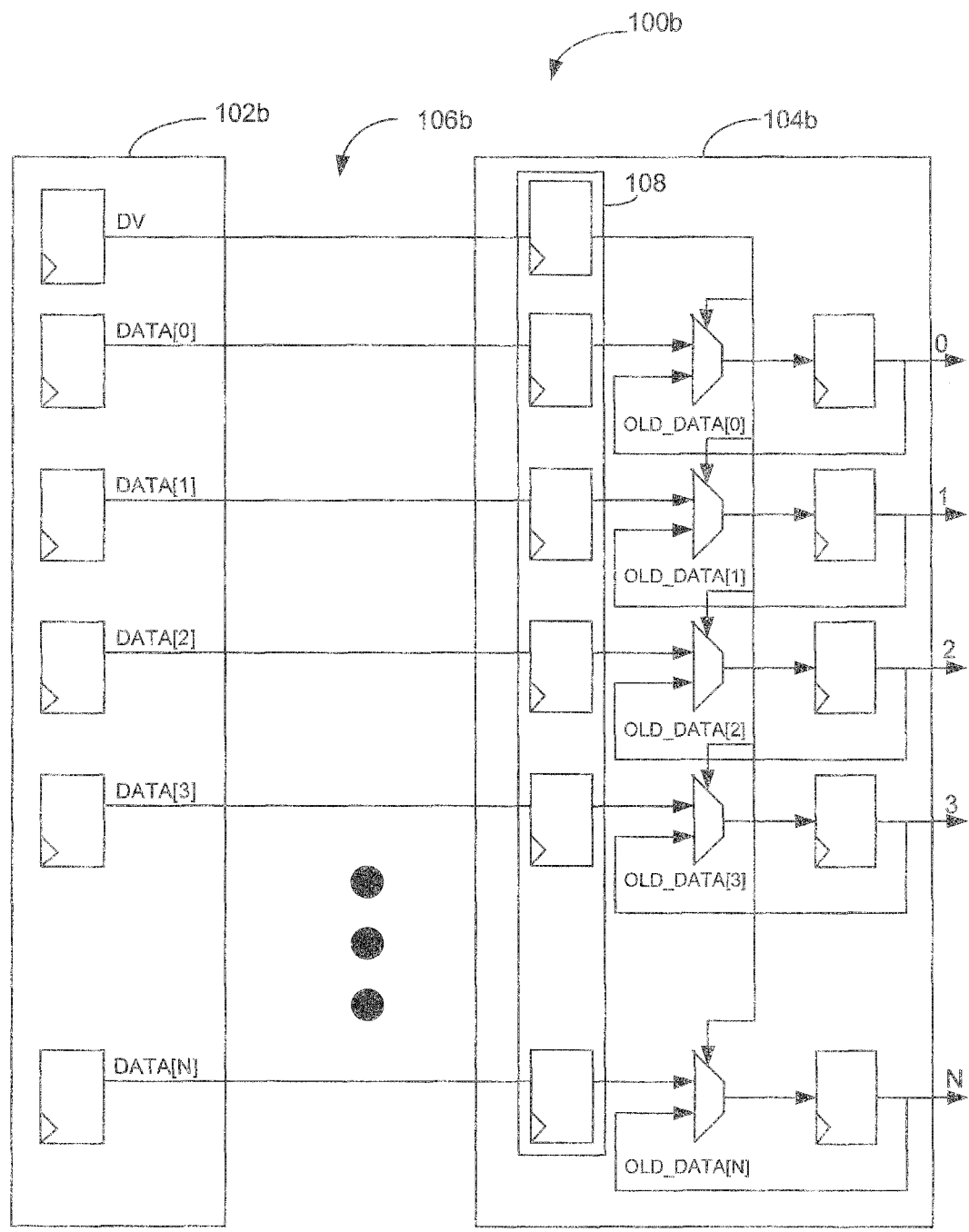
FIG. 2 is a schematic diagram of another prior art data transmission system.
Figure 3:
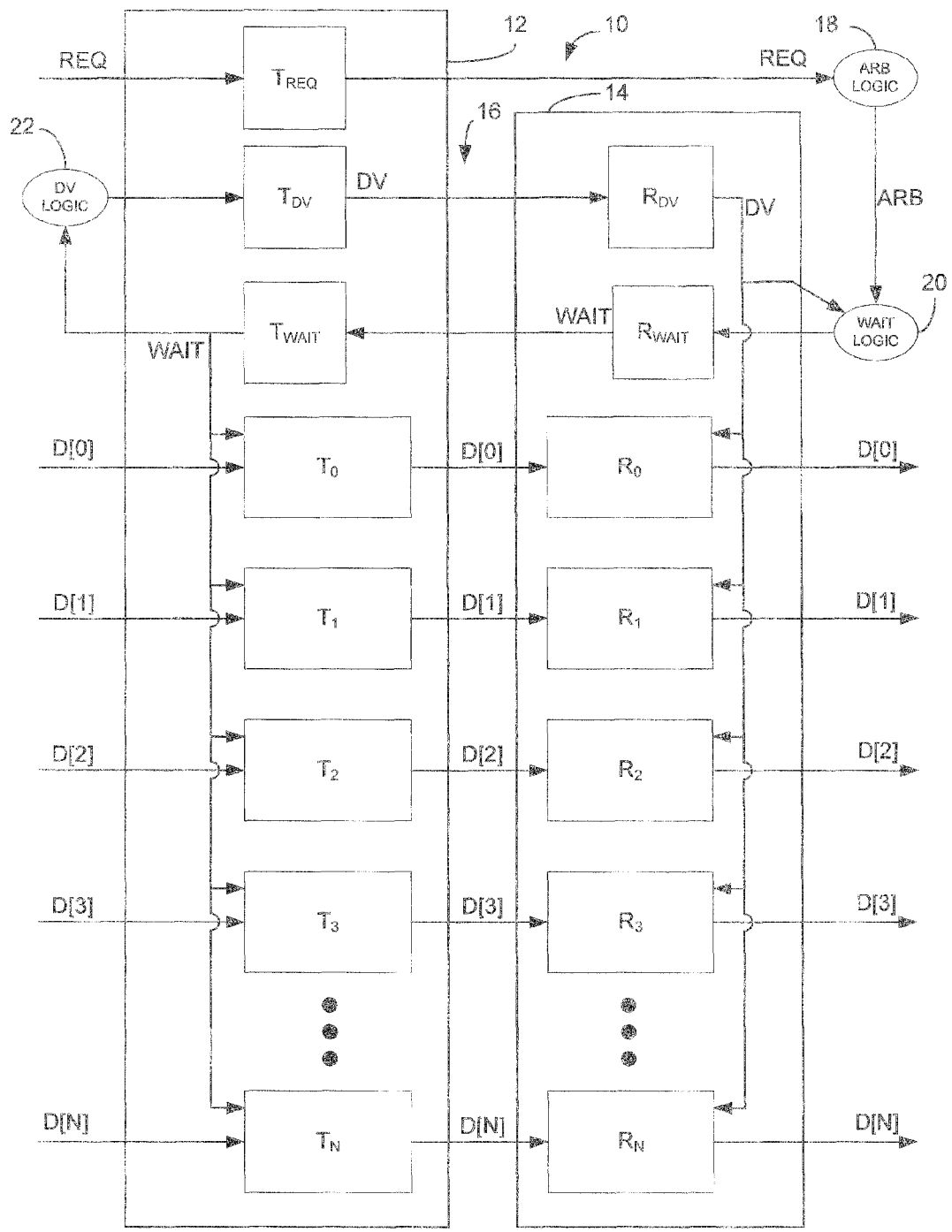
FIG. 3 is a block diagram of the data transmission system according to the present invention.

As shown in FIG. 3, the data transmission system 10 according to the invention includes a transmitter 12 coupled to a receiver 14 via a data bus 16. The data transmission system 10 operates to transmit data between a data source and a data destination. The data source and data destination may be any devices between which data is transmitted. In one embodiment of the invention, the data source is a PCI Express module which transmits data to a number of data destinations or clients.

Transmitter 12 includes a number N of transmission devices $T_0$-$T_N$, each of which receive a data bit D[0]-D[N], respectively, for transmission from a data source (not shown) to the receiver 14. In one embodiment of the invention, the number N is 72, i.e. bits 0-71. It will be understood, however, that the selection of the number N depends on the transmission requirements of the system and therefore, any number N may be utilized. Transmitter 12 also includes a request signal transmission register $T_{REQ}$, a data valid signal transmission register $T_{DV}$ and a WAIT signal receiving register $T_{WAIT}$. Receiver 14 includes a corresponding number N of reception devices $R_0$-$R_N$, each coupled to the data bus 16 to receive data bits D[0]-D[N], respectively, from the corresponding transmission device $T_0$-$T_N$. Reception devices $R_0$-$R_N$ each include outputs for passing the data bits D[0]-D[N] to the data destination (not shown). Receiver 14 also includes a data valid signal reception register $R_{DV}$ and a WAIT signal transmission register $R_{WAIT}$. The system 10 further includes arbitration logic device 18, WAIT logic device 20 and data valid logic device 22.

Figure 4:
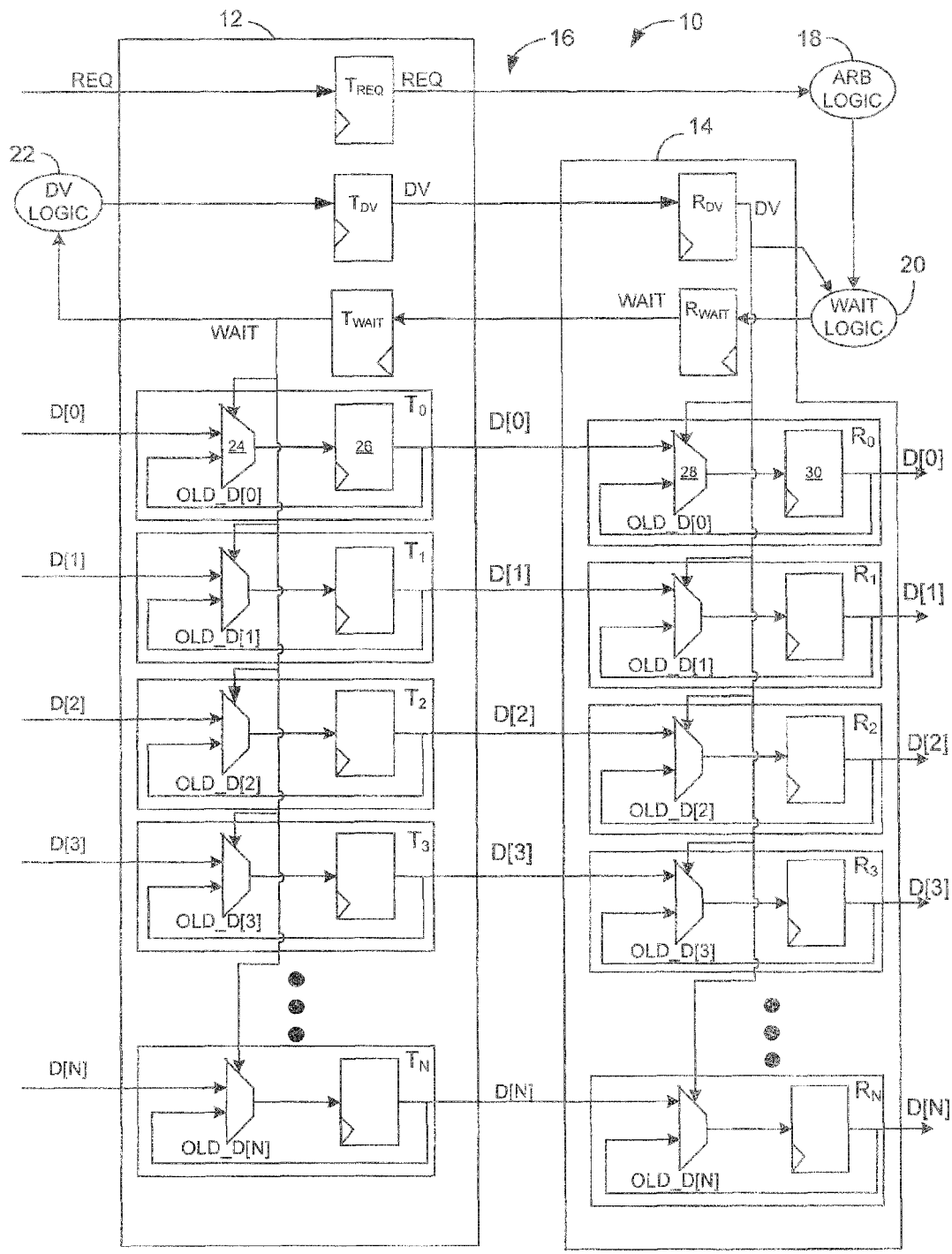
FIG. 4 is a more detailed schematic diagram of the data transmission system according to the present invention.

FIG. 4 is a schematic diagram showing an embodiment of the invention in which each of the transmission devices $T_0$-$T_N$ includes a multiplexer 24 and a register 26. One input of the multiplexer 24 receives the data input, D[0]-D[N], from the data source. The output of the multiplexer 24 is coupled to the input of the register 28 and the output of the register 28 is coupled to an input of a corresponding reception device via the data bus 16, as well as to the second input of the multiplexer 24. The control input of multiplexer 24 is coupled to the WAIT signal.

Likewise, each of the reception devices $R_0$-$R_N$ includes a multiplexer 28 and a register 30. One input of the multiplexer 28 receives the data input D[0]-D[N] from the corresponding transmission device $T_0$-$T_N$, respectively, via the data bus 16. The output of the multiplexer 28 is coupled to the input of the register 30 and the output of the register 30 is coupled to the data destination, as well as to the second input of the multiplexer 28. The control input of multiplexer 28 is coupled to the DV signal.

Figure 5:
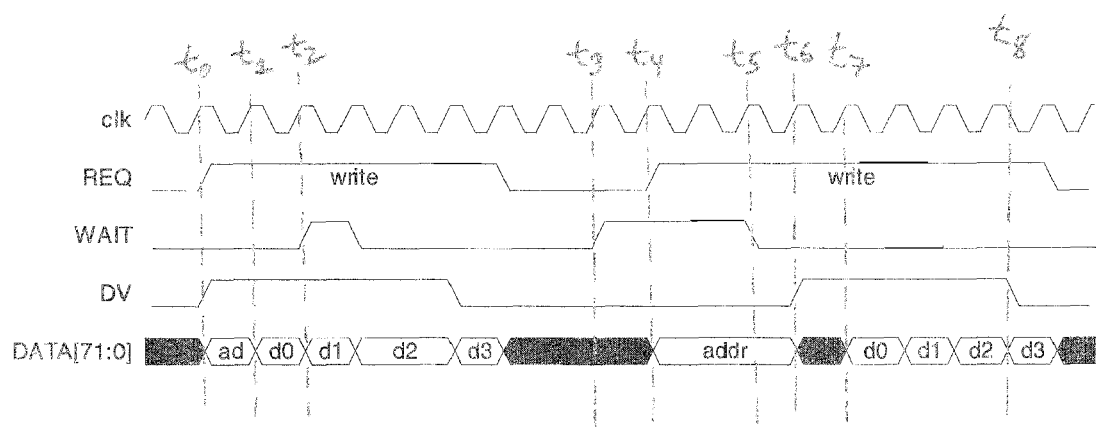
FIG. 5 is a waveform diagram showing the signals transmitted between the transmitter and receiver in the data transmission system of FIGS. 3 and 4 according to the present invention.

The operation of the data transmission system 10 will be described with reference to FIG. 5, which is a waveform diagram showing the timing of the signals REQ, WAIT, DV and DATA, as well as the clock. When data is to be transmitted by the data source, the data source instructs the data valid logic 22 to assert the data valid signal DV from data valid transmission register $T_{DV}$. At time $t_0$, the DV signal is asserted from the data valid signal transmission register $T_{DV}$ and received by the data valid signal reception register $R_{DV}$. On the next clock, at time $t_1$, the asserted DV signal is transmitted from the data valid signal reception register $R_{DV}$ to the control inputs of each of the multiplexers 28 of the reception devices $R_0$-$R_N$. On the same clock, the data bits D[0]-D[N] are transmitted from the transmission devices $T_0$-$T_N$, respectively, to the first inputs of the corresponding multiplexer 28 for each of the reception devices $R_0$-$R_N$. The asserted DV signal input to each of the control inputs of the multiplexers 28 causes the multiplexer to pass the data bits D[0]-D[N] through the reception devices $R_0$-$R_N$ to the destination device. As shown in FIG. 5, as long as the DV signal is asserted, the data packets d0, d1, d2, d3, etc., each of which comprise all of bits D[0]-D[N] for each clock cycle, are transmitted through the receiver 14 to the destination device. Since the DV signal is one clock cycle ahead of the data, when the DV signal is deasserted by the data valid logic 22, on the next clock cycle, when the deasserted DV signal is transmitted to the control input of the multiplexers 28 from the data valid signal reception register $R_{DV}$, the multiplexer will pass the data bits at the second input thereof, OLD_D[0]-OLD_D[N], which is fed back from the output of the register 30.

In a similar fashion, when the receiver 14 needs to pause the transmission of data by the transmitter 12, for example to enable a previous transmission from another transmitter to complete, the wait logic 20 instructs the WAIT signal transmission register $R_{WAIT}$ to assert the WAIT signal to the WAIT signal receiving register $T_{WAIT}$. The WAIT signal is asserted to the WAIT signal receiving register $T_{WAIT}$ at time $t_2$ and the WAIT signal is transmitted by the WAIT signal receiving register $T_{WAIT}$ to the control inputs of multiplexers 24 on the next clock cycle. As shown in FIG. 5, the transmission of the data is paused on the clock cycle after the WAIT signal is asserted. Since, as shown in the figure, the WAIT signal is only asserted for one clock cycle, the data packet d2 is only paused for one cycle.

When the asserted WAIT signal is transmitted to the control input of the multiplexer 24, the multiplexer 24 stops passing the data D[0]-D[N] from the first input thereof and passes the data OLD_D[0]-OLD_D[N], which is fed back from the output of the register 30. This acts to hold the current data packet, d2 in FIG. 5, at the output of transmission devices $T_0$-$T_N$.

Based on the rules of the protocol under which the data transmission system operates, which is described in more detail below with reference to FIG. 9, the states of the WAIT and DV signals must be monitored by the data valid logic 22 and WAIT logic 20, respectively. Therefore, the WAIT signal is input to the data valid logic 22 and the DV signal is input to the WAIT logic 20. One of the rules of the protocol is that the data valid signal DV cannot be asserted or deasserted while the WAIT signal is asserted. Therefore, each of the data valid logic 22 and the WAIT logic 20 must be aware of the state of the other signal during the operation of the system.

[Accordingly, because the DV and WAIT signals are asserted and registered one clock cycle before the data is transmitted and the registered DV and WAIT signals are transmitted to the reception devices $R_0$-$R_N$ and transmission devices $T_0$-$T_N$, respectively, on the same clock cycle that the data is transmitted by the transmission devices $T_0$-$T_N$, the data transmission system 10 operates at a low latency, since only one extra clock cycle is required to transmit the DV and WAIT signals. However, because the DV and WAIT signals are registered on the receiving side, there is no delay in transmitting the DV and WAIT signals to the multiplexers. This enables the system 10 to operate at high frequencies. Lastly, because the data transmitted from the transmitter 12 to the receiver 14 does not need to be registered, the gate count of the system 10 is minimized.

Figure 6:
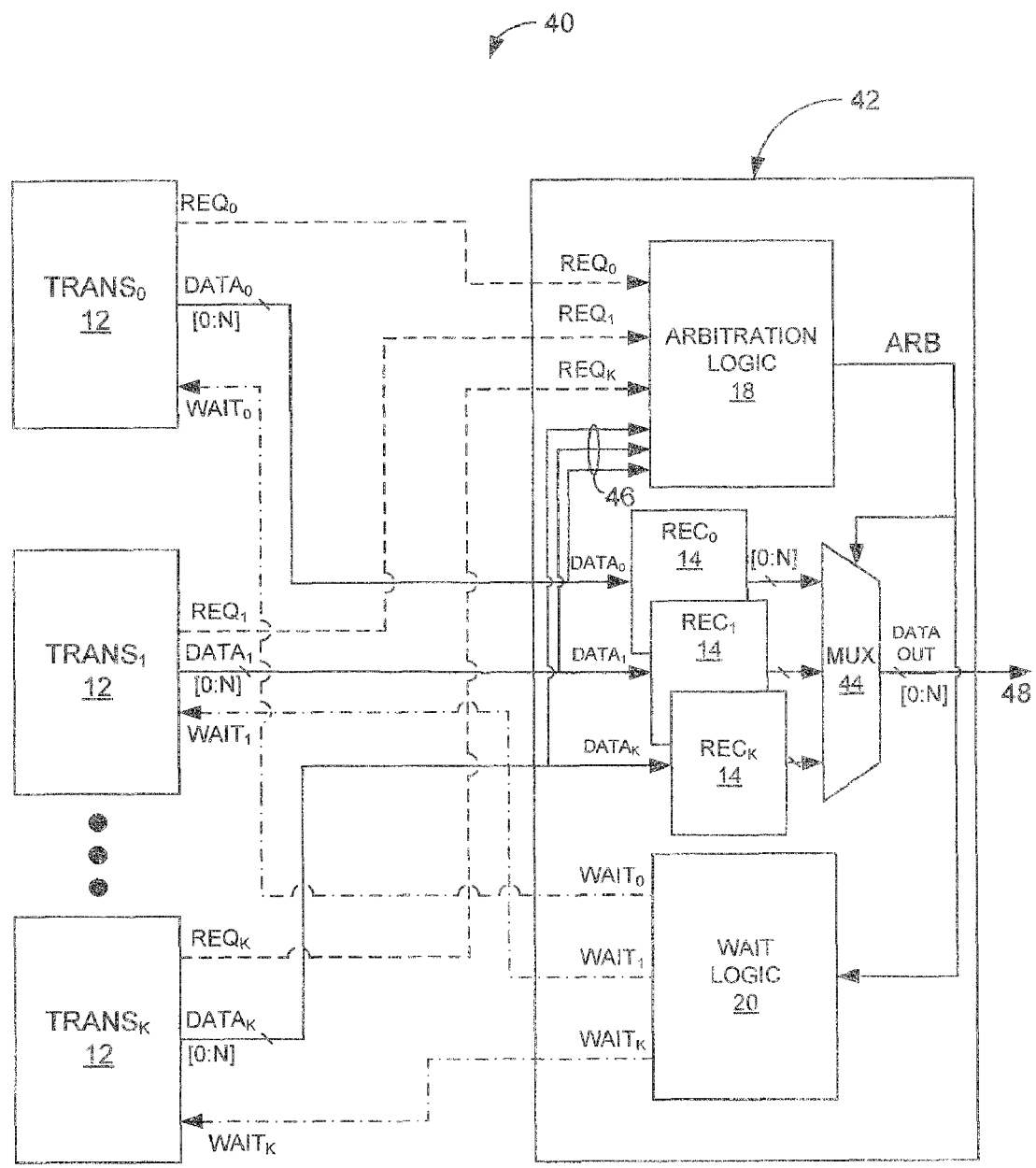
FIG. 6 is a schematic block diagram of the data transmission system of the present invention showing multiple transmitters.

In addition to using the WAIT signal to pause a current transmission as described above, the data transmission system of the invention also utilizes the WAIT signal to grant data transmission requests to the transmitters and to arbitrate data transmissions from multiple transmitters to the receiver. FIG. 6 is a schematic block diagram showing this aspect of the invention. Data transmission system 40 includes a number K of transmitters 12, $TRANS_0$-$TRANS_K$. Each of transmitters $TRANS_0$-$TRANS_K$ are constructed as shown in FIG. 4 and operate as described above. Also shown in FIG. 6 is a receiver system 42 which includes a number K of receivers 14, $REC_0$-$REC_K$. Each of receivers $REC_0$-$REC_K$ are constructed as shown in FIG. 4 and operate as described above. Receiver system 42 also includes arbitration logic 18, wait logic 20 and a multiplexer device 44. It will be understood that the number K may be any number, depending on the transmission requirements of the system.

Each transmitter $TRANS_0$-$TRANS_K$ outputs its data transfer request signal $REQ_0$-$REQ_K$ to the arbitration logic 18 and outputs the data that is transmitted $DATA_0$-$DATA_K$ to the receivers $REC_0$-$REC_K$. Each transmitter $TRANS_0$-$TRANS_K$ receives as an input a WAIT signal $WAIT_0$-$WAIT_K$ from the WAIT logic 20. Arbitration logic device 18 receives as inputs each of the transmission request signals REQ output by the request signal transmission register $T_{REQ}$ of each of the transmitters 12. When a transmitter 12 needs to transmit data to the receiver, it asserts its REQ signal from the request signal transmission register $T_{REQ}$ to notify the receiver that it is requesting permission to transmit data. Along with the assertion of the REQ signal, the transmitter transmits the address to which the data transmission is being requested. The address is transmitted over the data bus 16 in the same manner as the data itself. In one embodiment of the invention, the WAIT signal $WAIT_0$-$WAIT_K$ is normally asserted. Referring to FIG. 5 As shown at time $t_0$, the WAIT signal is asserted. This will pause the transmission of data by the transmitter 12. In this instance, since no data is being transmitted at time $t_3$, the asserted WAIT signal will stop the transmitter from beginning a new data transmission. At time $t_4$, the transmitter asserts its REQ signal to request permission from the receiver to begin a data transmission. The address "addr" is transmitted to the receiver at this time. However, since the WAIT signal is asserted, the address is held on the data bus 16.

The WAIT signal is sampled only in certain states i.e. in the data transmission state. So, when the transmitter is putting the address on the data bus 16 it does not sample the WAIT signal. This is because the protocol rule states that the address can be put onto the data bus 16 without any regard to WAIT signal. Once the address is put on the bus, then the transmitter goes into the state where it sends the data but only when there is no WAIT signal asserted.

At time $t_5$, the WAIT signal for the transmitter is deasserted and, at time $t_6$, the data valid signal DV is asserted by the transmitter. Since the data valid signal DV is registered on the receiver side, as described above, the data transmission begins one clock cycle after the assertion of the DV signal, at time $t_7$. For the same reason, when the DV signal is deasserted at time $t_8$, the data transmission ends one clock cycle later.

Figure 7:
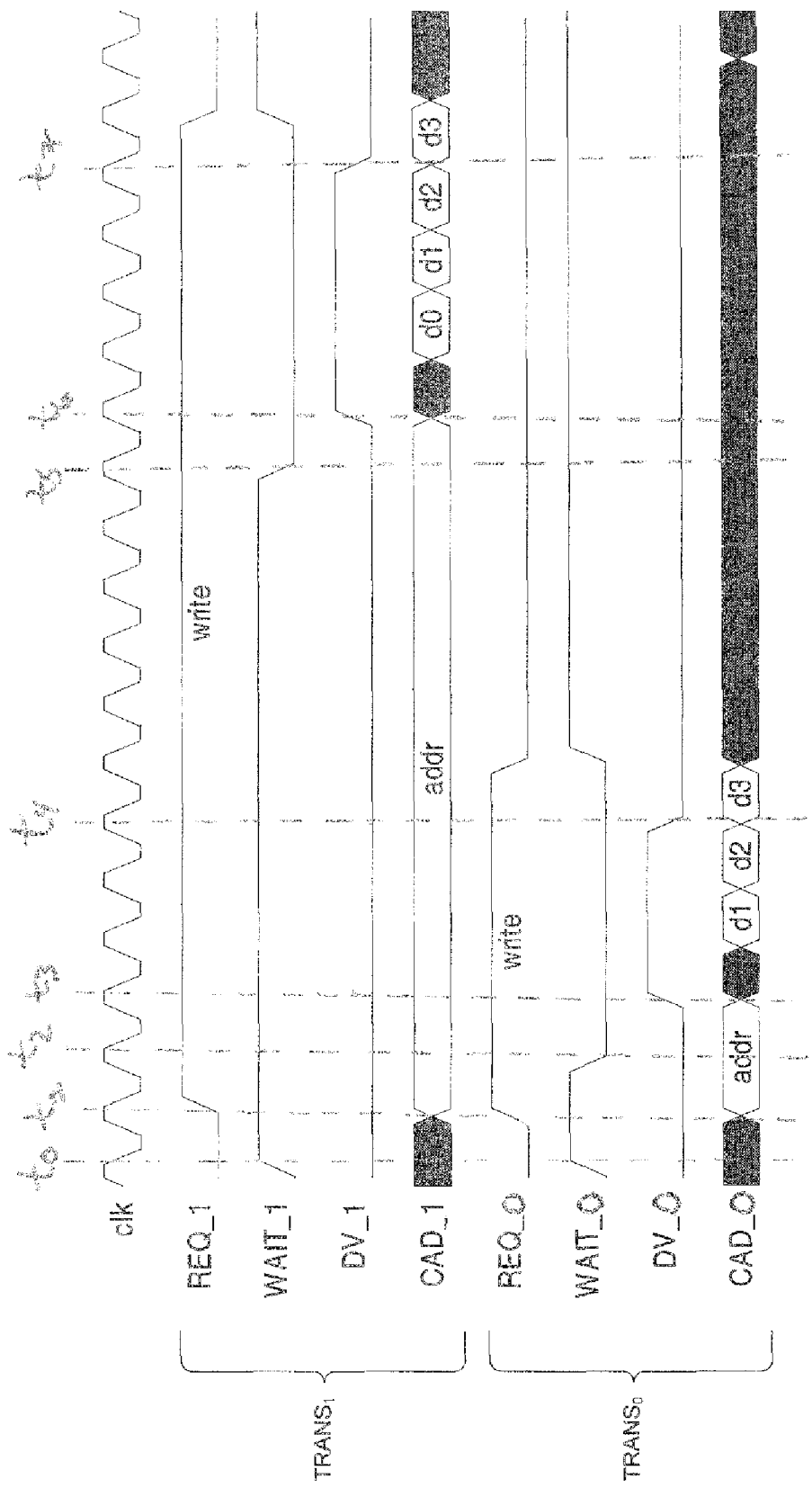
FIG. 7 is a waveform diagram showing the signals transmitted between first and second transmitters and the receiver according to the present invention.

Since several of the K transmitters $TRANS_0$-$TRANS_K$ may request permission to transfer data to the receiver at the same time, the arbitration logic 18 must determine which of the requesting transmitters will be granted permission to transmit data. The data transmission system 40 of the invention utilizes the WAIT signals to grant permission to the selected transmitter, while preventing the remaining transmitters from transmitting data until the arbitration logic grants one of them permission to transmit. FIG. 7 is a waveform diagram showing the signals REQ, WAIT and DV, as well as the clock and DATA signal associated with each of the transmitters $TRANS_0$ and $TRANS_1$. At time $t_0$, the signals $WAIT_0$ and $WAIT_1$ from the WAIT logic 20 to $TRANS_0$ and $TRANS_1$, respectively, are asserted. This prevents any data transmission from either of the transmitters. At time $t_1$, both transmitters assert their respective request signals $REQ_0$ and $REQ_1$, thereby both requesting permission to transmit data to the receiver at the same time. Concurrently with the assertion of the REQ signals, each transmitter $TRANS_0$ and $TRANS_1$ also transmits the address to which its data is to be transmitted to its corresponding receiver $REC_0$ and $REC_1$, respectively.

As shown in FIG. 6, arbitration logic 18 receives the REQ signals, as well as at least a portion of the address from each transmitter, shown at 46, which is transmitted to the corresponding receiver $REC_0$ and $REC_1$ on the data lines $DATA_0$ and $DATA_1$. The arbitration logic 18 determines which of the transmitters $TRANS_0$ and $TRANS_1$ it will grant permission based on an arbitration scheme implemented by the arbitration logic 18. Any type of arbitration scheme may be used, depending on the requirements of the data transmission system 40. For example, the arbitration scheme may be a round robin scheme; certain transmitters may always be given priority over other transmitters; reads may be given priority over writes, etc. The portion 46 of the address input to the arbitration logic 18 will provide information to the arbitration logic 18 that will enable the arbitration logic to make a determination as to which transmitter will be granted permission to transmit data. For example, the portion 46 may include a bit or bits that identify the transmitters or that indicate whether the request is for a data read or data write. The implementation of the arbitration logic 18 will depend on the actual scheme employed by the system, and will be known to those of skill in the art.

Based on the result of the arbitration process carried out by arbitration logic 18, arbitration logic 18 outputs an arbitration signal ARB to the WAIT logic 20. Signal ARB instructs the WAIT logic 20 to deassert the WAIT signal for the transmitter that has been granted permission to transmit its data. In the example of FIG. 7, the arbitration logic 18 outputs an ARB signal that instructs the WAIT logic 20 to deassert the wait signal $WAIT_0$, to enable transmitter $TRANS_0$ to transmit its data. Accordingly, at time $t_2$, signal $WAIT_0$ is deasserted from WAIT signal transmission register $R_{WAIT}$ to the WAIT signal receiving register $T_{WAIT}$. One clock cycle later, at time $t_3$, the $WAIT_0$ signal is transmitted from the WAIT signal receiving register $T_{WAIT}$ to the multiplexers 24 and the DV logic 22. With the $WAIT_0$ signal deasserted, the transmitter asserts its data valid signal DV at time $t_3$ and the data transmission from transmitter $TRANS_0$ to receiver $REC_0$ begins one clock later.

As shown in FIG. 6, each of the outputs of receivers $REC_0$ to $REC_K$ are input to a multiplexer device 44. The output of the arbitration logic 18 is input to the control input of the multiplexer device 44 and it controls which of the inputs to the multiplexer device 44 will be passed through to the output 48 of the receiver system 42. Since, in this example, the signal ARB has instructed the WAIT logic 20 to deassert wait signal $WAIT_0$ to enable transmitter $TRANS_0$ to transmit its data $DATA_0$, the ARB signal also instructs the multiplexer device 44 to pass the data $DATA_0$ from receiver $REC_0$ through the multiplexer device to the output 46. Multiplexer device 44 prevents any old data on any of the non-selected transmitter-receiver pairs from passing through to the output 48.

Referring back to FIG. 7, when the transmitter $TRANS_0$ is about to complete its transmission, it deasserts its $DV_0$ signal at time $t_4$, and the data transmission is completed one clock later, when the deasserted DV signal is input to the multiplexers 28 from the DV signal receiving register $R_{DV}$. When the data transmission is complete, the transmitter deasserts its request signal $REQ_0$, and the arbitration logic instructs the WAIT logic 20 to assert the wait signal $WAIT_0$ to prevent an unauthorized data transmission from transmitter $TRANS_0$.

During the data transmission by the transmitter $TRANS_0$, the address output by the transmitter $TRANS_1$ is held on the outputs of the transmitter $TRANS_1$ because its wait signal $WAIT_1$ remains asserted by WAIT logic 20. At time $t_5$, based on the arbitration scheme implemented by arbitration logic 18, the signal ARB output to the WAIT logic 20 instructs WAIT logic 20 to deassert the wait signal $WAIT_1$, thus granting the transmitter $TRANS_1$ permission to begin its data transmission. The ARB signal also instructs the multiplexer device 44 to pass the data $DATA_1$ from receiver $REC_1$ through the multiplexer device to the output 48. One clock after wait signal $WAIT_1$ is deasserted, transmitter $TRANS_1$ asserts its data valid signal $DV_1$ at time $t_6$ and the data transmission begins one clock later. One clock before the data transmission is complete, transmitter $TRANS_1$ deasserts its data valid signal $DV_1$ and, one clock later, deasserts its request signal $REQ_1$. This results in the arbitration logic 18 instructing the WAIT logic to assert the WAIT signal $WAIT_1$ to prevent an unauthorized data transmission from transmitter $TRANS_1$.

Accordingly, the data transmission system 40 enables the use of the WAIT signals for the purposes of delaying the commencement of a data transmission from a transmitter, arbitrating data transmission permission between multiple transmitters, as well as pausing a data transmission as it is taking place.

As described above, typical transmitters do not have error recovery mechanisms because their implementation can tend to be complicated. Therefore, the natural response of a faulty transmitter is to reset itself and then wait for instructions from its control unit. The transmitter's sudden failure might cause an unpredictable behavior on the receiver side, which in turn could have a catastrophic impact on the entire data transmission system.

Figure 8:
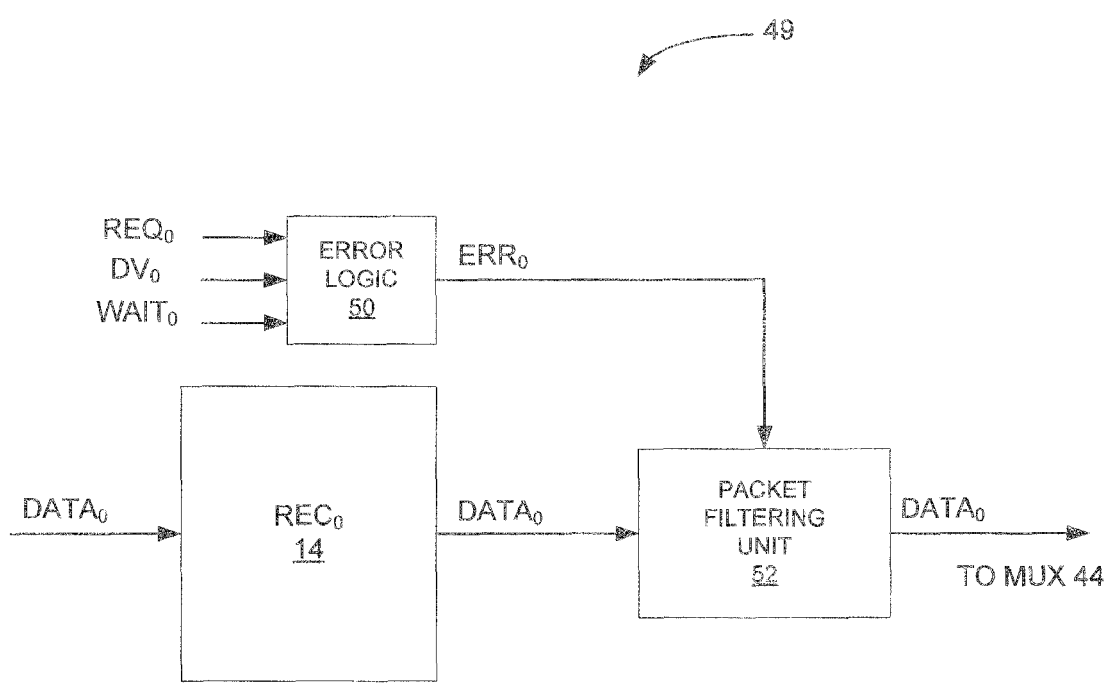
FIG. 8 is a schematic block diagram of the error reporting device according to the present invention.

FIG. 8 is a schematic block diagram of an error recovery mechanism 49 of the present invention. Shown in FIG. 8 is one of the receivers $REC_0$ through which the data $DATA_0$ is transmitted. An error logic device 50 receives as an input the request signal $REQ_0$, the data valid signal $DV_0$ and the wait signal $WAIT_0$. Output from the error logic device 50 is an error signal $ERR_0$ which is input to a packet filtering unit 52, along with the data $DATA_0$. Although only one error recovery mechanism 49 is shown in FIG. 8, there is preferably an error recovery unit associated with each of the receivers $REC_0$-$REC_K$.

Error logic device 50 monitors the states of the request signal $REQ_0$, the data valid signal $DV_0$ and the wait signal $WAIT_0$ and applies protocol rules set forth below to the relative states of the signals to determine whether an error, either in the operation of the associated transmitter or in the data that is being transmitted, has occurred.

While not an exhaustive list of the protocol rules that may be applied by the error logic unit, the following are examples of such rules:

1. The request signal REQ must not be deasserted if the WAIT signal is asserted.
2. The request signal REQ and the data valid signal DV must not be deasserted at the same time unless the transmitter is transmitting an erroneous data packet.
3. The data valid signal must not be asserted or deasserted while the WAIT signal is asserted.

A violation of any of the above rules is indicative of a faulty transmitter, or in the case of Rule 2, that the transmitter has detected a fault in the data packet being transmitted. As each data packet is transmitted through the receiver, the error logic unit 50 monitors the relative states of the request signal $REQ_0$, the data valid signal $DV_0$ and the wait signal $WAIT_0$ and applies the above protocol rules and/or any others that may be defined for the system to the relative states of the signals to determine whether an error either in the operation of the associated transmitter or in the data that is being transmitted has occurred. If any of the defined rules, such as those set forth above, are violated, the error logic device 50 asserts the error signal $ERR_0$ to the packet filtering unit 52. During normal operation, the packet filtering unit 52 collects and stores the bits of each data packet before it is output to the multiplexer device 44 when the transmission of the entire data packet is completed. However, when the error signal $ERR_0$ is asserted, the packet filtering unit will drop the entire packet before it is output to the multiplexer 44. The dropping of the entire packet will enable the receiver to continue operating normally, rather than the case where an erroneous or incomplete packet is transmitted through the receiver, in which case, the receiver may fail or cause erroneous data to be transmitted to the data destination.

Figure 9:
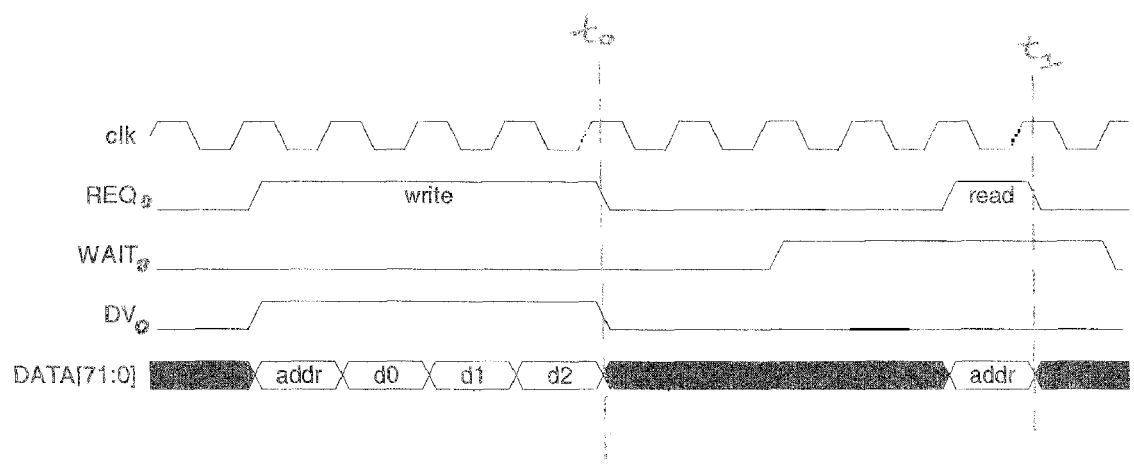
FIG. 9 is a waveform diagram showing the signals transmitted between the transmitter and receiver in the data transmission system of FIGS. 3 and 4 according to the present invention.

As shown in FIG. 9 at time $t_0$, when the request signal $REQ_0$ and the data valid signal $DV_0$ are deasserted at the same time in violation of Rule 2, the error logic device 50 asserts the error signal $ERR_0$ to the packet filtering unit 52, which drops the entire packet from being transmitted to the multiplexer device 44. As shown at time $t_1$, if the request signal $REQ_0$ is deasserted while the WAIT signal $WAIT_0$ is asserted, in violation of Rule 1, the error logic device 50 again asserts the error signal $ERR_0$ to the packet filtering unit 52, which drops the entire packet, which in this case is the address, from being transmitted to the multiplexer device 44.

Alternatively, instead of dropping the entire packet, the packet filtering unit 52 may alter the packet in such a way as to notify downstream error-checking devices (not shown) that the packet is faulty. For example, the packet filtering unit 52 may introduce a parity error, a CRC error, etc. This would allow the faulty packet to be transmitted downstream, but would insure that the faulty packet is identified and possibly corrected by error checking devices of the system.

The implementation of the error logic device 50 and the packet filtering unit 52 will depend on the rules that will be monitored and the resulting action to be taken. It will be understood that such implementation will be known to those of skill in the art.

Accordingly, the error recovery mechanism 48 enables the data transmission system 40 to identify and react to errors on the transmission side of the system by monitoring the relative states of the request signal $REQ_0$, the data valid signal $DV_0$ and the wait signal $WAIT_0$. Predefined protocol rules are applied to the signals and action is taken when one or more of the rules are violated. The error recovery mechanism makes use of preexisting signals of the system to notify the receiver of errors in the transmitter and/or in the transmitted data. The receiver is then able to react accordingly and the possibility of a receiver failure resulting from a transmitter failure is greatly reduced.

The invention may be embodied in other specific forms without departing from the spirit or essential characteristics thereof. For example, while the invention is described as having a one clock cycle delay between the assertion of the data valid and WAIT signals and the result of the assertion of these signals, it will be understood that the particular number of clock cycles can vary and that any number of clock cycles may be utilized for the delay, with the resulting variation in the operating frequency of the transmission system. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A system for arbitrating a transmission of data comprising:
a number K of transmitters, each transmitter including a number N of data transmission devices, a request signal transmission device for transmitting a request signal, a data valid signal transmission device, a wait signal reception device, and a data valid logic device coupled to the data valid signal transmission device for transmitting a data valid signal to a receiver, wherein a transmitter asserts its request signal to request permission to begin a data transmission and transmits transmission-identifying information; and the receiver including a data valid signal reception device, a wait signal transmission device, and an arbitration logic device coupled to receive the request signal and the transmission-identifying information from each of the request signal transmission devices of the K transmitters, a wait logic device coupled to transmit a wait signal to each of the wait signal reception devices of the K transmitters, and K data registers, each including N data reception devices, each of the N data reception devices of each of the K data registers being coupled to a corresponding one of the N data transmission devices of a corresponding one of the K transmitters;

wherein the data valid logic device deasserts the data valid signal based on a state of the wait signal, thereby preventing a transmission of data from each of the K transmitters at one clock cycle after a clock cycle at which the data valid signal is deasserted;

wherein the wait logic device instructs the wait signal transmission device to assert the wait signal to each wait signal reception device of the K transmitters, thereby preventing a transmission of data from each of the K transmitters at one clock cycle after a clock cycle at which the wait signal is asserted; and wherein, upon the arbitration logic device receiving asserted request signals and transmission-identifying information from more than one of the K transmitters, based on a predetermined arbitration scheme that uses the transmission-identifying information, the arbitration logic device selects one of the more than one transmitters to grant permission to transmit data to the receiver and outputs a first arbitration signal to the wait logic device instructing the wait logic device to deassert the wait signal of the selected transmitter, thereby enabling the N data transmission devices of the selected transmitter to transmit data to the associated N data reception devices at one clock cycle after a clock cycle at which the data valid logic transmits the data valid signal upon receiving the wait signal from the wait signal transmission device.

2. The system of claim 1 wherein the receiver further includes a multiplexer device having K inputs, each coupled to an output of a different one of each of the K data registers, the multiplexer receiving the first arbitration signal from the arbitration logic device and enabling the output of the data register coupled to the selected transmitter to pass to an output of the multiplexer device.

3. The system of claim 2 wherein upon a deassertion of the request signal of the selected transmitter, the arbitration logic device outputs a second arbitration signal to the wait logic device instructing the wait logic device to assert the wait signal of the selected transmitter.

4. The system of claim 3 wherein the multiplexer receives the second arbitration signal from the arbitration logic device and disables the output of the data register coupled to the selected transmitter.

5. The system of claim 1 wherein the predetermined arbitration scheme is a round robin scheme.

6. The system of claim 1 wherein the predetermined arbitration scheme favors particular transmitters over others.

7. The system of claim 1 wherein the transmission-identifying information includes an address and the arbitration logic device receives at least one bit of the address and selects one of the transmitters to grant permission to transmit data to the receiver based on the at least one address bit.

8. The system of claim 1 wherein upon a deassertion of the request signal of the selected transmitter, the arbitration logic device outputs a second arbitration signal to the wait logic device instructing the wait logic device to assert the wait signal of the selected transmitter.

9. A method of arbitrating a transmission of data comprising:
  A. asserting wait signals to each of a plurality of transmitters by a wait logic device of a receiver to prevent a transmission of data from any of the plurality of transmitters;
  B. transmitting a request signal from each of the plurality of transmitters to an arbitration logic device of the receiver and transmission-identifying information from each of the plurality of transmitters to the receiver;
  C. the arbitration logic device selecting one of the plurality of transmitters based on a predetermined arbitration scheme that uses the transmission-identifying information;
  D. the arbitration logic device outputting a first arbitration signal to the wait logic device instructing the wait logic device to deassert the wait signal input by the wait logic device to the selected transmitter;
  E. the selected transmitter asserting a data valid signal at one clock cycle after a clock cycle at which the wait signal input is deasserted; and
  F. the selected transmitter transmitting data to the receiver at one clock cycle after a clock cycle at which the data valid signal is asserted.

10. The method of claim 9 wherein the predetermined arbitration scheme is a round robin scheme.

11. The method of claim 9 wherein the predetermined arbitration scheme favors particular transmitters over others.

12. The method of claim 9 further including:
  G. the selected transmitter deasserting its request signal; and
  H. the arbitration logic device outputting a second arbitration signal to the wait logic device instructing the wait logic device to assert the wait signal of the selected transmitter.

13. The method of claim 9 wherein the receiver includes a plurality of data registers, each being coupled to one of the plurality of transmitters for receiving data input thereto by the one of the plurality of transmitters and outputting the received data and a multiplexer device for receiving an output of each of the plurality of data registers and the first arbitration signal as a control signal;
  wherein, in Step F, the first arbitration signal from the arbitration logic device is input to the multiplexer which instructs the multiplexer device to output the data input thereto from the data register coupled to the selected transmitter.

14. A system for arbitrating a transmission of data comprising:
  a number K of transmitters, each transmitter including a number N of data transmission devices, a request signal transmission device for transmitting a request signal and a wait signal reception device, wherein a transmitter asserts its request signal to request permission to begin a data transmission and transmits transmission-identifying information; and a receiver including an arbitration logic device coupled to receive the request signal and the transmission-identifying information from each of the request signal transmission devices of the K transmitters, a wait logic device coupled to transmit a wait signal to each of the wait signal reception devices of the K transmitters, and K data registers, each including N data reception devices, each of the N data reception devices of each of the K data registers being coupled to a corresponding one of the N data transmission devices of a corresponding one of the K transmitters;

wherein a data valid signal is deasserted based on a state of the wait signal, thereby preventing a transmission of data from each of the K transmitters at one clock cycle after a clock cycle at which the data valid signal is deasserted;

wherein the wait logic device asserts the wait signal to each wait signal reception device of the K transmitters, thereby preventing a transmission of data from each of the K transmitters at one clock cycle after a clock cycle at which the wait signal is asserted; and wherein, upon the arbitration logic device receiving asserted request signals and transmission-identifying information from more than one of the K transmitters, based on a predetermined arbitration scheme that uses the transmission-identifying information, the arbitration logic device selects one of the more than one transmitters to grant permission to transmit data to the receiver and outputs a first arbitration signal to the wait logic device instructing the wait logic device to deassert the wait signal of the selected transmitter, thereby enabling the N data transmission devices of the selected transmitter to transmit data to the associated N data reception devices at one clock cycle after a clock cycle at which the data valid signal is transmitted upon receiving the wait signal.

* * * * *